United States Patent
Dan

(10) Patent No.: US 7,202,630 B2
(45) Date of Patent: Apr. 10, 2007

(54) TRAVELING CLEANER CHARGING DEVICE AND METHOD

(75) Inventor: Byung-Ju Dan, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 253 days.

(21) Appl. No.: 10/740,109

(22) Filed: Dec. 17, 2003

(65) Prior Publication Data
US 2004/0130290 A1 Jul. 8, 2004

(30) Foreign Application Priority Data
Dec. 17, 2002 (KR) .................. 10-2002-0080836

(51) Int. Cl.
*H01M 10/44* (2006.01)
*H01M 10/46* (2006.01)

(52) U.S. Cl. ........................................... 320/115

(58) Field of Classification Search ............... 320/104, 320/108, 109, 114, 115
See application file for complete search history.

(56) References Cited

U.S. PATENT DOCUMENTS 5,109,566 A * 5/1992 Kobayashi et al. ........... 15/319
5,440,216 A 8/1995 Kim et al.
5,523,666 A 6/1996 Hoelzl et al.
5,572,109 A * 11/1996 Keith ........................ 320/109
5,634,237 A * 6/1997 Paranjpe ..................... 15/319
5,682,640 A 11/1997 Han et al.

FOREIGN PATENT DOCUMENTS

| GB | 2 407 651 A | 5/2005 |
| JP | 64-23385 | 2/1989 |
| JP | 5061545 | 3/1993 |
| JP | 6315205 | 11/1994 |

* cited by examiner

*Primary Examiner*—Edward H. Tso
(74) *Attorney, Agent, or Firm*—Lee, Hong, Degerman, Kang & Schmadeka

(57) ABSTRACT

An automatic charging device and method of an automatically traveling cleaner are disclosed. Since a charging terminal unit is installed inside a traveling cleaner and selectively drawn out, the traveling cleaner is prevented from being damaged from collision with an object while being moved forwardly. In addition, because a power source terminal, a contact sensor unit and a charging terminal unit are formed in a shape of a circular arc, the entering angle of the traveling cleaner widens, so that the charging induction time can be much reduced and the charging can be performed easily and quickly.

12 Claims, 6 Drawing Sheets

TRAVELING CLEANER CHARGING DEVICE AND METHOD

Pursuant to 35 U.S.C. 119(a), this application claims the benefit of earlier filing date and right of priority to Korean Patent Application No. 10-2002-80836, filed on Dec. 17, 2002, the content of which is hereby incorporated by reference herein in its entirety.

BACKGROUND OF THE INVENTION

1. Field of the Invention

The present invention relates to an automatic charging device and method of an automatically traveling cleaner and, more particularly, to an automatic charging device and method of an automatically traveling cleaner capable of allowing an automatically traveling cleaner to return to a charger for an automatic charging.

2. Description of the Conventional Art

In general, an automatically traveling cleaner is a device having a function of cleaning by sucking dust or the like while going around indoors. The automatically traveling cleaner includes a direction-changing caster formed at one side of the bottom of a round-shaped main body, driving wheels formed at both sides of the other side of the bottom, and a dust sucking opening formed at a front side of the bottom.

In order to charge a battery installed in the traveling cleaner, a cord installed at a rear side of the traveling cleaner can be connected to a charger, or a charger sensing unit can be mounted at the traveling cleaner so that the traveling cleaner can search the charger and is automatically charged.

FIG. 1 is a schematic plane view showing a construction of an automatic charging device of the automatically traveling cleaner using a light emitting/receiving sensor in accordance with one conventional art.

As shown in FIG. 1, in the automatic charging device of the automatically traveling cleaner using the light emitting/receiving sensor in accordance with the conventional art, a power source terminal 12 is formed at one side of a charger 11 and a light emitting sensor 13 is installed at the other side thereof.

A driving wheel 31 is installed at both sides of the bottom of the traveling cleaner 30, a charging terminal unit 14 is installed at one side of the traveling cleaner 30 and a light receiving sensor 15 is installed at the other side thereof.

In the automatic charging device of the automatically traveling cleaner using the light emitting/receiving sensor constructed as described above, the charging terminal unit 14 is in contact with the power source terminal 13 by moving the automatically traveling cleaner 30 to a predetermined position so that the light receiving sensor 15 can sense beams radiated from the light emitting sensor 13. Reference numeral 'W' is a fixed structure such as a wall surface.

FIG. 2 is a schematic plane view showing a construction of an automatic charging device of an automatically traveling cleaner using a guide in accordance with another conventional art.

As shown in FIG. 2, the automatic charging device of an automatically traveling cleaner using a guide includes a power source terminal 22 formed at one side of a charger 21 and a guide 23 installed at the other side of the charger 21. Driving wheels 31 are installed at both sides of the bottom of the traveling cleaner 30, a charging terminal unit 24 is formed at one side of the traveling cleaner 30, and a contact sensor 25 is installed at the other side. θ is an installation angle of the guide, or an entering angle of the traveling cleaner.

In the automatic charging device of the automatically traveling cleaner using the guide as constructed above, when the automatically traveling cleaner 30 is moved and the contact sensor 25 comes in contact with the guide 23, the traveling cleaner 30 is moved forward or backward to allow the charging terminal unit 24 to be in contact with the power source terminal 22.

However, the automatically traveling cleaner as shown in FIG. 1 has a problem that the light receiving sensor may fail to sense beams radiated from the light emitting sensor due to an obstacle or the like, so the automatically traveling cleaner can not be smoothly charged.

Meanwhile, in the case of the automatically traveling cleaner as shown in FIG. 2, the installation angle of the guide installed in the charger is so small that the traveling cleaner has no choice but to enter within the limited angle. This means that the traveling cleaner can hardly approach the charger but also so much time is taken to approach.

SUMMARY OF THE INVENTION

Therefore, an object of the present invention is to provide an automatic charging device and method of an automatically traveling cleaner capable of allowing an automatically traveling cleaner to quickly approach a charger by avoiding an obstacle by itself and be charged.

To achieve these and other advantages and in accordance with the purpose of the present invention, as embodied and broadly described herein, there is provided an automatic charging device of an automatically traveling cleaner including: a charger having a power source terminal; a contact sensor unit installed at an automatically traveling cleaner so as to be in contact with the power source terminal; a charging terminal unit for slidably installed at the automatically traveling cleaner and selectively contacting the power source terminal; and a charging terminal unit driving unit for selectively drawing in and out the charging terminal unit.

To achieve the above objects, there is also provided an automatic charging method of an automatically traveling cleaner, including: a first step in which a traveling cleaner is approached toward a charger; a second step in which a charging terminal unit is drawn out when a forward object (that is, an object that the traveling cleaner meets in its proceeding) is in contact with a contact sensor unit while the traveling cleaner is being approached; a third step in which it is determined whether the forward object is the charger; a fourth step in which if the charging terminal unit is electrically connected with the forward object, the forward object is recognized as a charger, and the traveling cleaner is charged; and a fifth step in which if the charging terminal unit is not electrically connected with the forward object, the forward object is recognized as an obstacle, the charging terminal unit is returned to its original position, and the traveling cleaner is again approached toward the charger by avoiding the forward object.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

An automatic charging device of an automatically traveling cleaner in accordance with the present invention will now be described with reference to the accompanying drawings.

Figure 1:
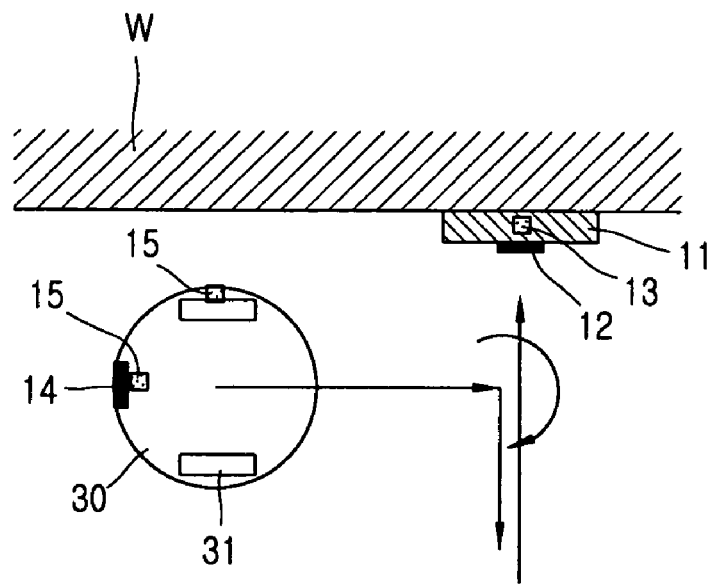
FIG. 1 is a schematic plane view showing a construction of an automatic charging device of an automatically traveling cleaner using a light emitting/receiving sensor in accordance with one conventional art.
Figure 2:
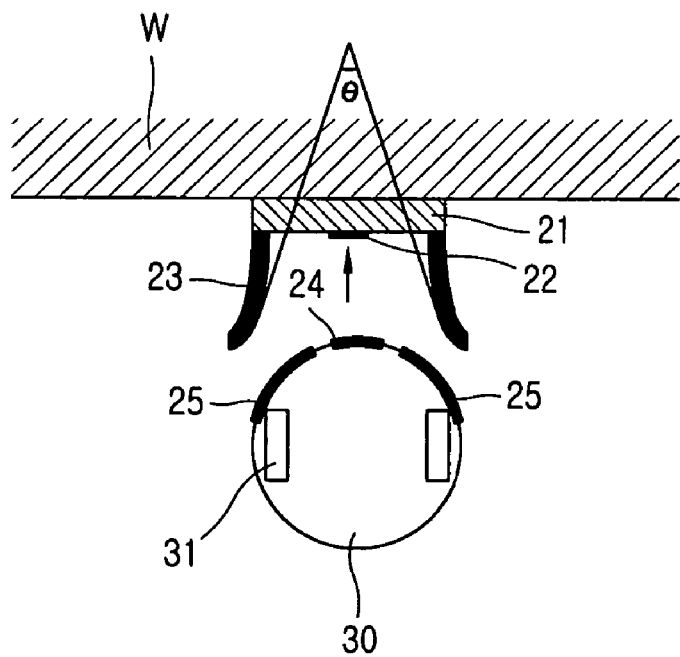
FIG. 2 is a schematic plane view showing a construction of an automatic charging device of an automatically traveling cleaner using a guide in accordance with another conventional art.
Figure 3:
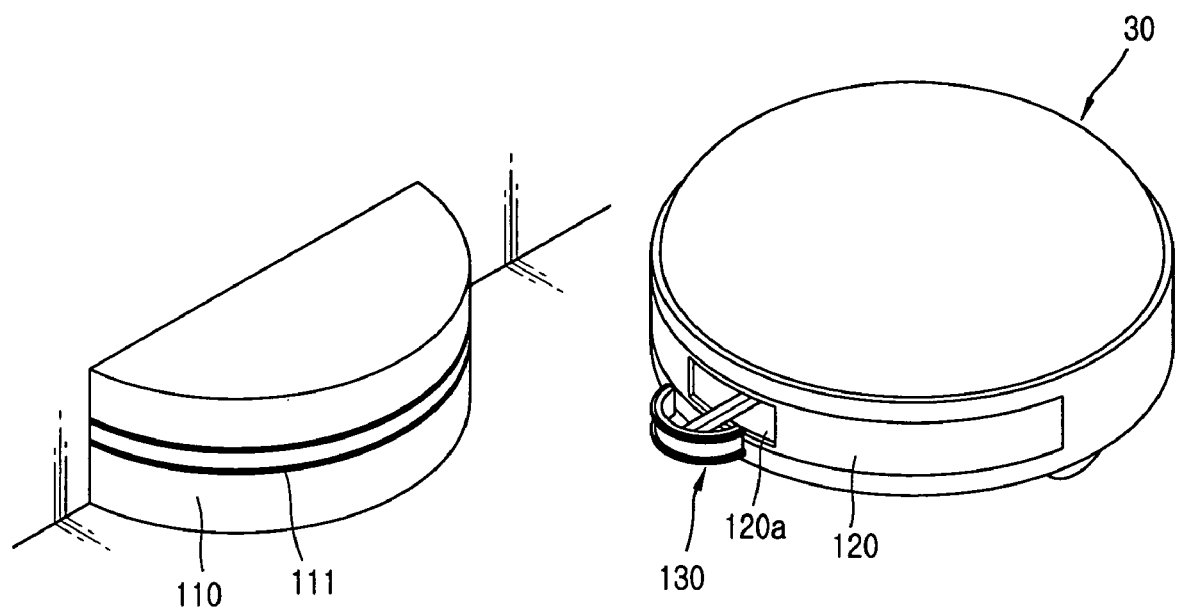
FIG. 3 is a perspective view showing an automatic charging device of an automatically traveling cleaner in accordance with the present invention.
Figure 4:
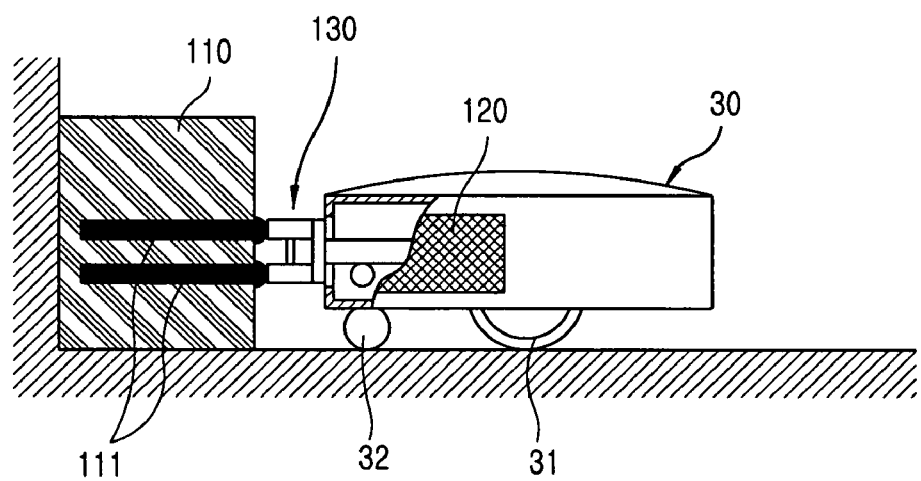
FIG. 4 is a partial vertical-sectional view showing the automatic charging device of an automatically traveling cleaner in accordance with the present invention.
Figure 5:
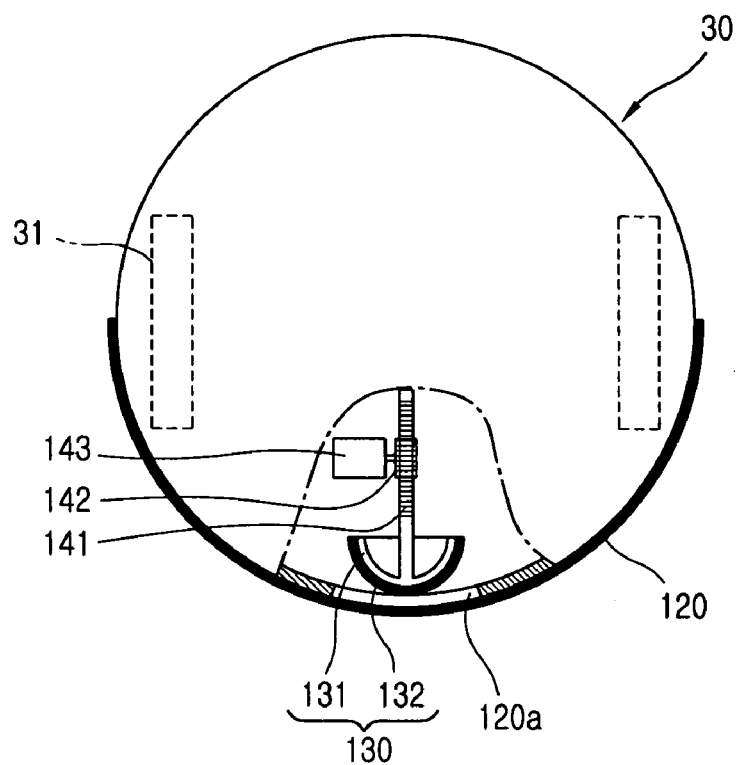
FIG. 5 is a plane view showing a charging terminal unit and a contact sensor unit installed in the automatically traveling cleaner.

FIG. 3 is a perspective view showing an automatic charging device of an automatically traveling cleaner in accordance with the present invention, FIG. 4 is a partial vertical-sectional view showing the automatic charging device of an automatically traveling cleaner in accordance with the present invention, and FIG. 5 is a plane view showing a charging terminal unit and a contact sensor unit installed in the automatically traveling cleaner.

As illustrated, the automatic charging device of an automatically traveling cleaner in accordance with the present invention includes: a charger 110 having a power source terminal 111; a contact sensor unit 120 installed at an automatically traveling cleaner 30 so as to be in contact with the power source terminal 111; a charging terminal unit 130 slidably installed at the automatically traveling cleaner 30 and being selectively contact with the power source terminal 111; and a charging terminal unit driving unit for selectively drawing in and out the charging terminal unit 130.

An opening 120a is formed at the middle portion of the contact sensor unit 120, through which the charging terminal unit 130 can be drawn in and out.

The power source terminal 111 is formed in a shape of a circular arc at an outer circumferential surface of the charger 110, and the contact sensor unit 120 is also formed in a shape of a circular arc at an outer circumferential surface of the automatically traveling cleaner 30 so as to correspond to the power source terminal 111. In addition, a front surface of the charging terminal unit 130 is also formed in a shape of a circular arc so as to correspond to the power source terminal 111.

Since the power source terminal 111, the contact sensor unit 120 and the charging terminal unit 130 are formed in the shape of the circular arc, an entering angle of the traveling cleaner 30 becomes wide, and thus, a charging induction time of the traveling cleaner 30 can be much reduced, and charging can be performed easily and quickly.

As the contact sensor unit 130, there can be used a tact switch, an optical sensor using ultrasonic waves or infrared rays, or a magnetic sensor sensing a strength of a magnetic field.

Installed in the traveling cleaner 30, the charging terminal unit 130 is selectively drawn out, so that when the traveling cleaner 30 advances, it can be prevented from being damaged by possible collision with an object.

The charging terminal unit 130 is moved in a radial direction of the traveling cleaner 30 through the opening formed at the outer circumferential surface of the traveling cleaner 30.

Preferably, the power source terminal 111, the contact sensor unit 120 and the charging terminal are positioned at the same level so that when the charging terminal unit 130 is drawn out to be connected to the power source terminal 111, they can smoothly contact each other.

Figure 6:
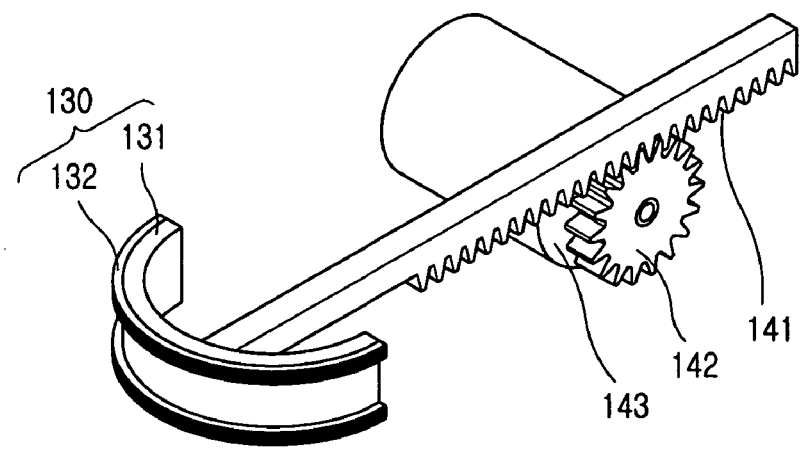
FIG. 6 is a perspective view showing one example of a charging terminal unit driving unit.

FIG. 6 is a perspective view showing one example of a charging terminal unit driving unit.

As illustrated, the charging terminal unit driving unit includes: a rack 141 formed at one side of the charging terminal unit 130, a pinion 142 engaged with the rack 141, and a drive motor 143 for rotating the pinion 142.

The charging terminal unit 130 consists of a charging terminal main body 131 and a charging electrode 132 attached at a front surface of the charging terminal main body 131.

Figure 7:
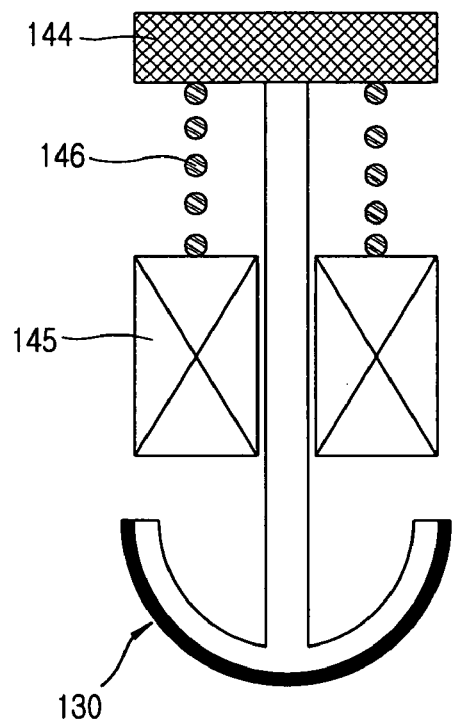
FIG. 7 is a plane view showing another example of the charging terminal unit driving unit.

FIG. 7 is a plane view showing another example of the charging terminal unit driving unit.

As illustrated, the charging terminal unit driving unit includes a moving plate 144 made of a steel material fixed at an end of the charging terminal unit 130, an electromagnet 145 fixed in the automatically traveling cleaner 30 and pulling up the moving plate 144; and an elastic member 146 installed between the moving plate 144 and the electromagnet 145.

The electromagnet 145 is magnetized to selectively pull up the moving plate 144 to draw the charging terminal unit 130 in and out of the traveling cleaner 30, and at this time, the elastic member 146 allows the charging terminal unit 130 to return to its original position.

Figure 8:
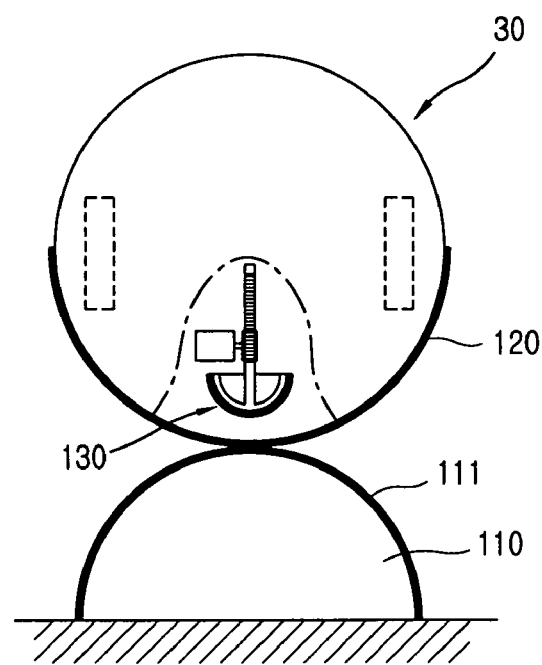
FIG. 8 is a plane view showing a state that the contact sensor unit is in contact with a power source terminal.
Figure 9:
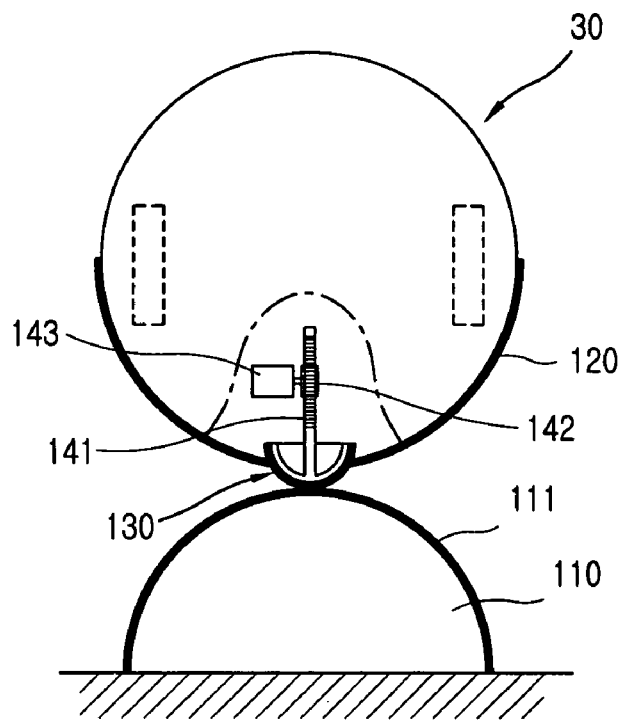
FIG. 9 is a plane view showing a state that the charging terminal unit is in contact with the power source terminal.

FIG. 8 is a plane view showing a state that the contact sensor unit is in contact with a power source terminal, and FIG. 9 is a plane view showing a state that the charging terminal unit is in contact with the power source terminal.

First, with reference to FIG. 8, the traveling cleaner 30 advances to approach the charger 110 according to a known art. At this time, the contact sensor unit 120 senses that the traveling cleaner 30 is in contact with the power source terminal 111 of the charger 110.

In this state, as shown in FIG. 9, the drive motor 143 operates to rotate the pinion 142. Then, the charging terminal unit 130 where the rack 141 is formed is drawn out of the traveling cleaner 30 according to the rotation of the pinion 142, so that the charging terminal unit 130 is maintained in a state of contacting the power source terminal 111.

In this state, the charging terminal unit 130 and the power source terminal 111 are electrically connected and the traveling cleaner 30 is charged.

Figure 10:
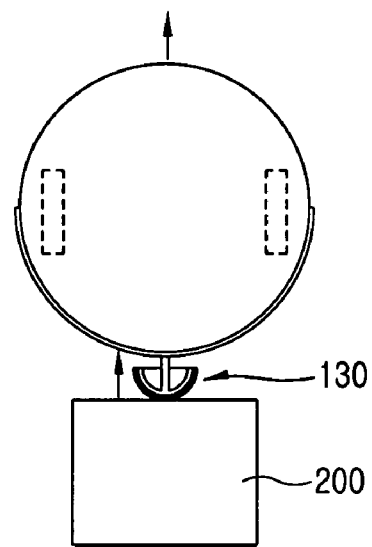
FIG. 10 is a plane view showing a state that the charging terminal unit is in contact with an obstacle.

Meanwhile, as shown in FIG. 10, if the traveling cleaner 30 meets an obstacle 200 while approaching the charger 110, the charging terminal unit 130 is drawn out of the traveling cleaner 30 and maintained in a state of contacting the obstacle 200. In this case, obstacles are mostly non-conductive materials, so the charging terminal unit 130 would not be electrically connected with the obstacle 200.

At this time, the traveling cleaner 30 returns the charging terminal unit 130 to its original position, and moves backward (reversely) to avoid the obstacle 200 and approaches the charger 110 again. Reference numeral 32 denotes an auxiliary wheel.

The charging method of the automatically traveling cleaner of the present invention will now be described in detail with reference to FIG. 11.

Figure 11:
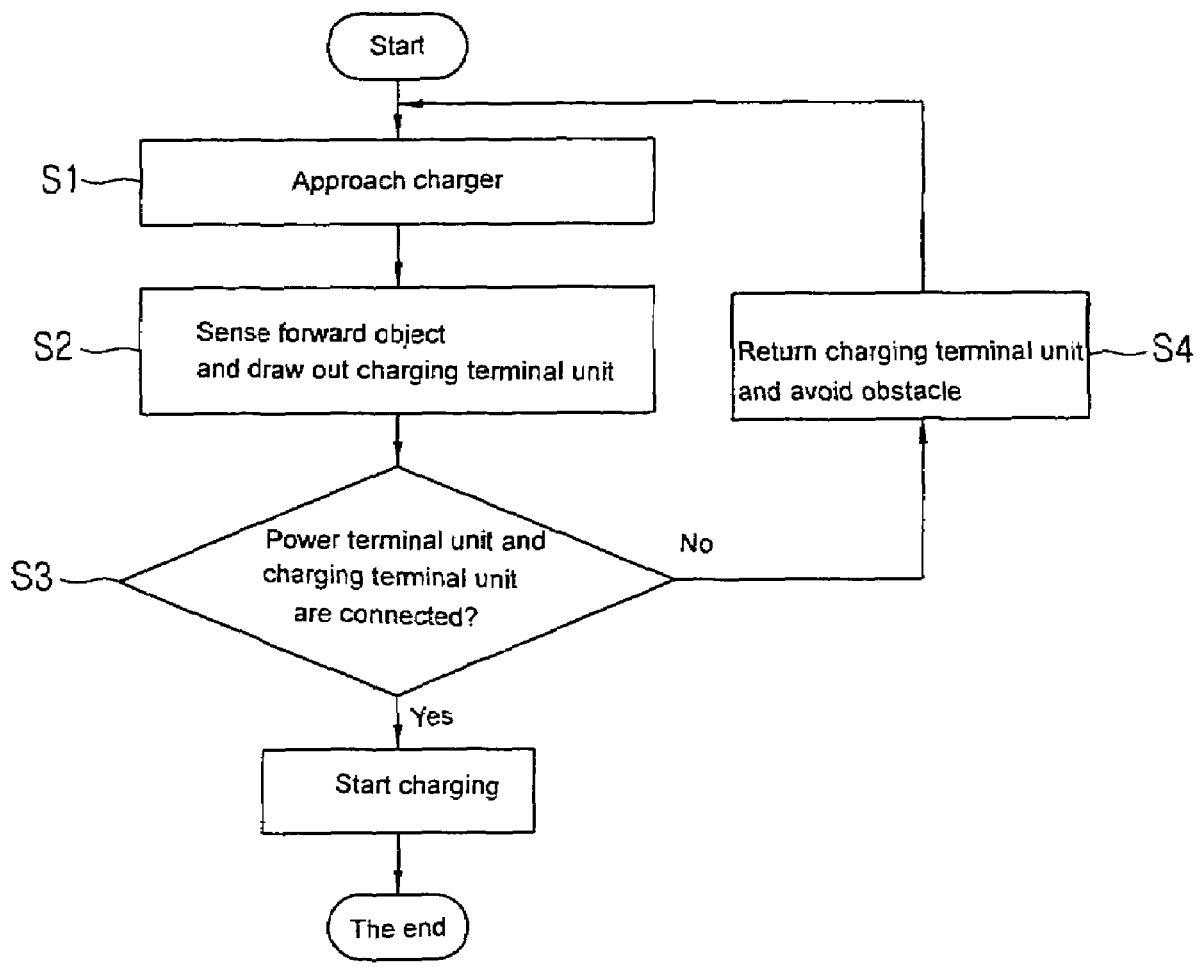
FIG. 11 is a flow chart of an automatic charging method of the automatically traveling cleaner in accordance with the present invention.

FIG. 11 is a flow chart of an automatic charging method of the automatically traveling cleaner in accordance with the present invention.

As illustrated, the charging method of the automatically traveling cleaner includes a first step (S1) in which the traveling cleaner approaches the charger; a second step (S2) in which if a forward object is contacted to the contact sensor unit while the traveling cleaner is being approached, the charging terminal unit is drawn out; a third step (S3) in which it is determined whether the forward object is a charger; a fourth step (S4) in which if the charging terminal unit is electrically connected to the forward object, the forward object is recognized as a charger and the traveling cleaner is charged; and a fifth step (S5) in which if the charging terminal unit is not electrically connected with the forward object, the forward object is recognized as an obstacle, the charging terminal unit is returned to its original position, and the traveling cleaner is again approached toward the charger by avoiding the forward object.

In the first step, if a battery capacity is dropped to below a pre-set level while the traveling cleaner performs a cleaning operation, the traveling cleaner approaches toward the charger according to the known art. While the traveling cleaner is proceeding to the charger, it may meet an obstacle or directly approaches the charger without facing the obstacle.

In the second step, if the contact sensor unit contacts the forward object while the traveling cleaner is being approached, the charging terminal unit is drawn out of the traveling cleaner through the charging terminal unit driving unit.

In the third step, it is determined whether the forward object is a charger or an obstacle.

In the fourth and fifth steps, if the charging terminal unit is electrically connected to the forward object, the forward object is recognized as a charger and the traveling cleaner is charged. Conversely, if the charging terminal unit is not electrically connected to the forward object, the forward object is recognized as an obstacle, so the charging terminal unit is returned to its original position and then the traveling cleaner is again approached toward the charger by avoiding the forward object.

As so far described, the automatic charging device and method of an automatically traveling cleaner in accordance with the present invention have the following advantages.

That is, first, since the charging terminal unit is installed inside the traveling cleaner and selectively drawn out, the traveling cleaner is prevented from being damaged from collision with an object while being moved forwardly.

In addition, because the power source terminal, the contact sensor unit and the charging terminal unit are formed in a shape of a circular arc, the entering angle of the traveling cleaner widens, so that the charging induction time can be much reduced and the charging can be performed easily and quickly.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A charging device for a traveling cleaner comprising:
a charger having a power source terminal;
a contact sensor unit installed on the traveling cleaner for contacting with an object;
a charging terminal unit slidably installed on the traveling cleaner and determining whether the object is the charger having the power source terminal, and selectively contacting the power source terminal; and
a charging terminal unit driving unit for selectively extending and retracting the charging terminal unit when the contact sensor detects the object.

2. The device of claim 1, wherein an opening is formed at the middle portion of the contact sensor unit, allowing the charging terminal unit to be extended and retracted.

3. The device of claim 1, wherein the power source terminal is formed in a shape of a circular arc at an outer circumferential surface of the charger, and the contact sensor unit is also formed in a shape of a circular arc at an outer circumferential surface of the automatically traveling cleaner so as to correspond to the power source terminal.

4. The device of claim 1, wherein the power source terminal and the contact sensor unit are positioned at the same level.

5. The device of claim 1, wherein a front surface of the charging terminal unit has a shape of a circular arc in order to correspond to the power source terminal.

6. The device of claim 1, wherein the charging terminal unit includes:
a charging terminal main body; and
a charging electrode attached at a front surface of the charging terminal main body.

7. The device of claim 1, wherein the charging terminal unit is moved in a radial direction of the traveling cleaner.

8. The device of claim 1, wherein the charging terminal unit driving unit comprises:
a rack formed at one side of the charging terminal unit;
a pinion engaged with the rack; and
a drive motor for rotating the pinion.

9. The device of claim 1, wherein when the contact sensor connects with the object and the charging terminal unit determines the object is not the charger, the charging terminal unit retracts and the traveling cleaner maneuvers around the object.

10. The device of claim 1, wherein when the contact sensor connects with the object and the charging terminal unit determines the object is the charger, the charging unit begins charging from the charger.

11. The device of claim 1, wherein the charging terminal unit driving unit comprises:
- a moving plate made of a steel material and fixed at an end of the charging terminal unit;
- an electromagnet fixed inside the traveling cleaner for selectively attracting the moving plate; and
- an elastic member biasing the moving plate from the electromagnet.

12. A method for charging a traveling cleaner, comprising:
- approaching an object such that a contact sensor unit on the traveling cleaner senses physical contact with the object;
- extending a charger terminal unit when the object is sensed by the contact sensor unit;
- determining whether the object is a charger having a power source terminal by sensing electrical contact between the charger terminal unit and the object, and if there is no electrical contact, retracting the charger terminal unit and maneuvering to avoid the object; and
- if electrical contact is made with the power source terminal, begin charging the traveling cleaner.

* * * * *